April 19, 1938.  J. A. YERKES  2,114,757

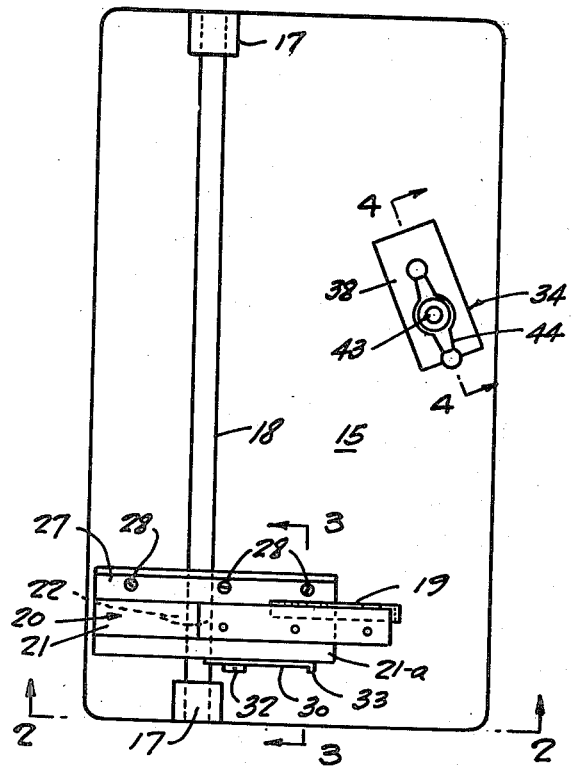
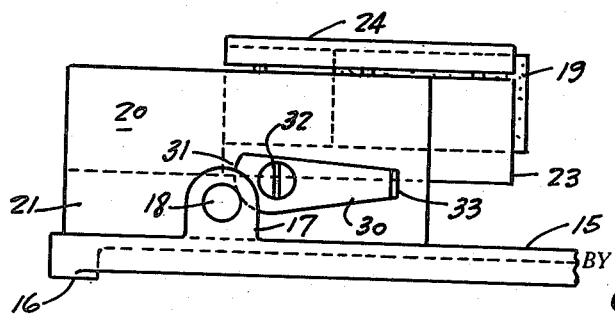
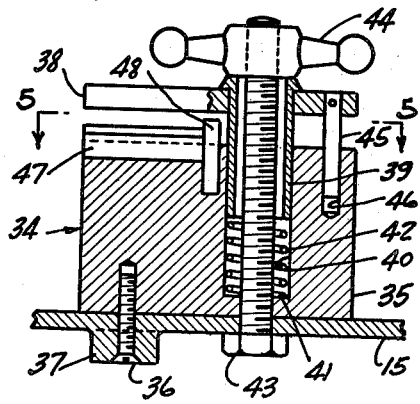
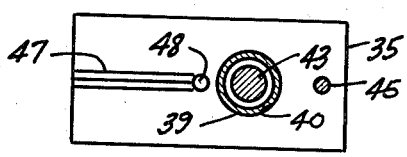
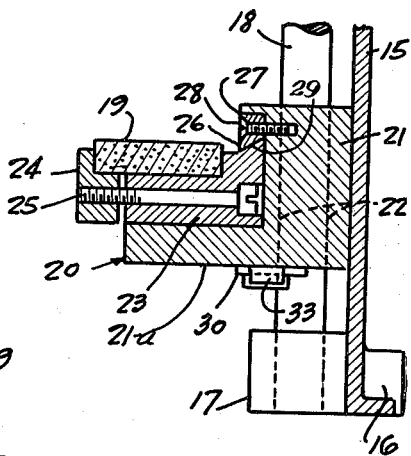

TOOL HOLDING AND SHARPENING DEVICE

Filed Oct. 25, 1935  3 Sheets-Sheet 2

INVENTOR.
John A. Yerkes
BY Joseph F. Westall
ATTORNEY.

April 19, 1938. J. A. YERKES 2,114,757
TOOL HOLDING AND SHARPENING DEVICE
Filed Oct. 25, 1935 3 Sheets-Sheet 3
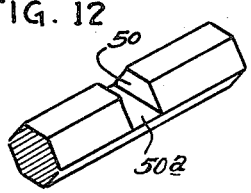
FIG. 12
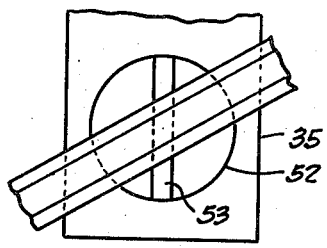
FIG. 14
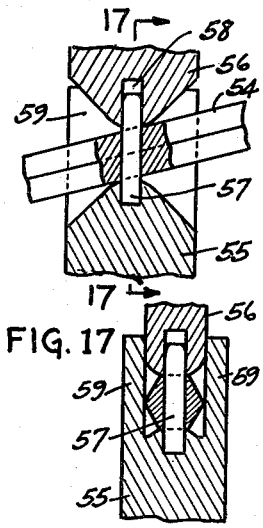
FIG. 16
FIG. 17
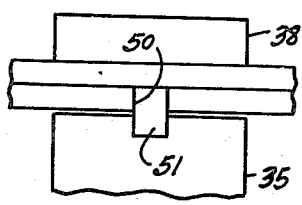
FIG. 13
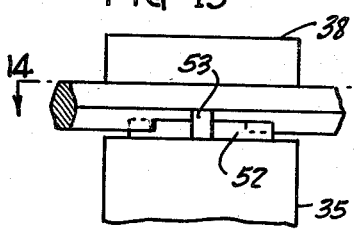
FIG 15
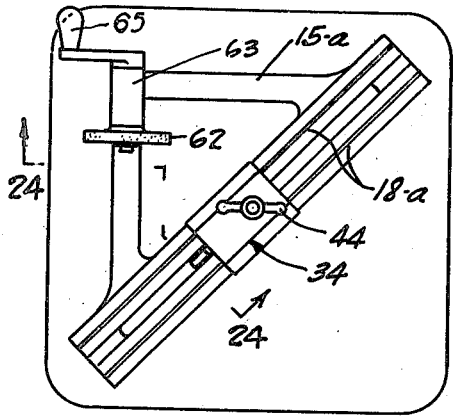
FIG. 23
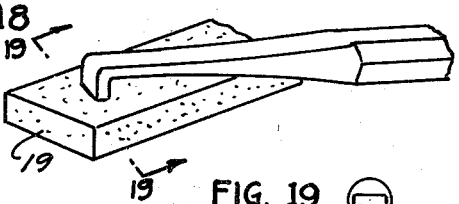
FIG. 18
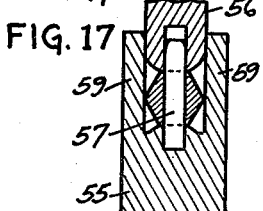
FIG. 19
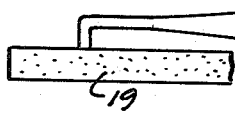
FIG. 21
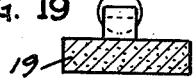
FIG. 20
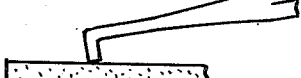
FIG. 22
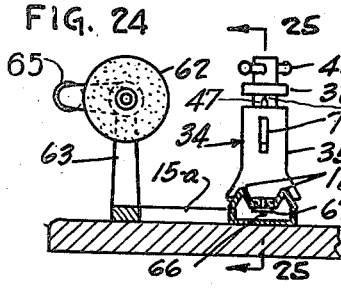
FIG. 24
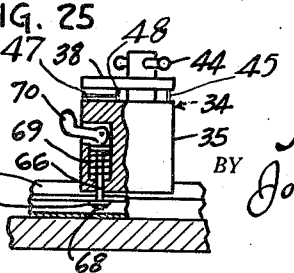
FIG. 25
INVENTOR.
John A. Yerkes
BY Joseph F. Westall
ATTORNEY.

Patented Apr. 19, 1938

2,114,757

UNITED STATES PATENT OFFICE 2,114,757

TOOL HOLDING AND SHARPENING DEVICE

John A. Yerkes, Beverly Hills, Calif.

Application October 25, 1935, Serial No. 46,709

8 Claims. (Cl. 51—125)

This invention relates generally to tool or instrument holding and sharpening devices, and while the particular embodiment hereinafter specifically described is designed for dental instrument sharpening, it will be obvious as the description proceeds that the means exemplified are adaptable, without departing from their essential principles, to the sharpening of cutting tools, devices, or instruments (of a character provided with comparatively narrow cutting edges, and having shanks or handles) of all kinds, in every appropriate art, and for all purposes.

A broad general object of the present invention is to provide a device adapted to sharpen tools and instruments of multitudinous designs, such tools or instruments having comparatively narrow cutting edges angularly disposed in various different planes relative to the axes of their handles.

It is also a specific object of my said invention to provide a holding device which will co-act with one or more of any or either of grooves, notches, perforations, holes, depressions, or specially cut surfaces formed in the respective shanks or handles of a variety of different cutting or scraping tools, implements, or instruments, to hold any of said different cutting devices, regardless of the angle or plane of its cutting edge with relation to the axis of its shank or handle, at a proper angle to permit a grinding or sharpening surface adapted to be actuated in a given plane, to form a moving, grinding, or abrasive contact therewith at a proper angle to restore condition as to angle of bezel and sharpness of its original cutting edge.

The highly skilled specialist-user of the tools or instruments adapted for the reconditioning herein contemplated can seldom economically devote adequate time to such chores as sterilizing, placing, replacing, checking, reconditioning, or supervising the reconditioning of instruments, with the consequence that such duties are frequently delegated to a more or less inexperienced assistant or helper; and with such circumstances in view, it is a vital object of my said invention to eliminate or reduce to a minimum requisite knowledge or skill in manipulation of tools or implements and the sharpening device forming the subject-matter hereof in the process of reconditioning contemplated.

Incidental to the above stated objects, to provide a simple and efficient means for moving the abrasive surface into contact at a proper angle for restoration of its original cutting edge, while the tool, implement, or instrument is firmly held at exactly the proper angle, are also important objects.

Obvious other important objects are simplicity and economy of construction, with consequent comparatively low cost, and the vital provision for building into the original tool or instrument the skill of its manufacturer, as a controlling feature in supervising its reconditioning.

In the drawings,—

Fig. 1 is a plan of the holding and sharpening mechanism in readiness to receive an instrument for sharpening;

Fig. 2 is an end elevation as indicated by lines 2—2 of Fig. 1;

Fig. 3 is a section on line 3—3 of Fig. 1, through the abrasive member and its holding and sliding mechanisms;

Fig. 4 is a section on line 4—4 of Fig. 1, illustrating principal features of the implement-holding means;

Fig. 5 is a view partly in plan and partly in section on line 5—5 of Fig. 4;

Fig. 12 illustrates a hexagonal portion of an instrument handle provided with an alternative form of clamping surface;

Fig. 13 is another modified form of clamping mechanism;

Figs. 14 and 15 show in plan and section another modification of clamp and instrument;

Figs. 16 and 17 show two sectional views relatively at right angles, an instrument having a hole thereon adapted for positioning between another modified clamping mechanism;

Figure 6:
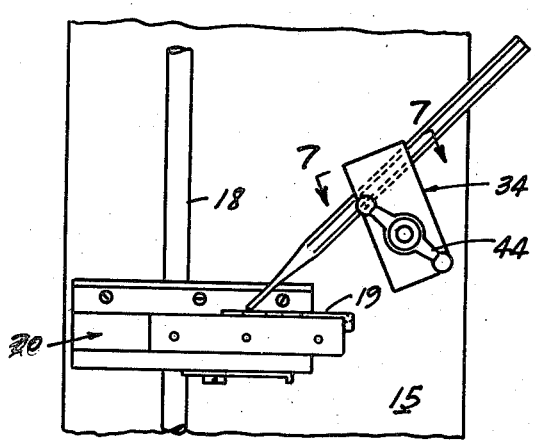
Fig. 6 is a fragmentary plan of subject-matter shown in Fig. 1 with the addition, however, of a dental instrument illustrated as clamped within its shank-holding means, the abrasive element carried by its sliding mechanism being illustrated as in contact for sharpening with the cutting edge of said instrument.

Figs. 18, 19, 20, 21, and 22 graphically depict the two movements necessary to obtain the correct angle of the axis of the instrument relative to the stone when the face of the cutting edge is in proper relation with the stone;

Fig. 23 is a plan similar to Fig. 1 of a modified form of my invention;

Fig. 24 is a section on lines 24—24 of Fig. 23;

Fig. 25 is an elevation partially in section, taken on lines 25—25 of Fig. 24, of the clamping means illustrated in Figs. 23 and 24.

Now referring to the drawings and specifically to the embodiment of my invention shown generally in Fig. 1, in which like numerals designate similar parts throughout the several views, 15 indicates a supporting base (see particularly Figs. 1, 2, and 6) preferably rectangular in plan, and provided adjacent and under each of its corners with short supporting legs 16. Upstanding lugs 17 secured in any suitable manner, as by screws (not shown) to opposite ends of supporting base 15 (or the same may be made integral with said base if so desired), form supports, perpendicular with respect to the plane of the upper surface of said base, for a cylindrical rod 18, opposite ends of which rod 18 are projected into and through appropriate bores in each of said lugs 17 into which said ends of rods 18 are secured in any suitable manner. 19 indicates an abrasive element, such as an oil stone, which is removably and adjustably held in mechanism adapted to slide upon rod 18 for the purpose and in the manner presently to be described.

Means slidable on rod 18 for varying the position of the abrasive element 19, and which involve means for permitting reciprocation of stone 19, transversely with respect to said rod 18, are indicated generally in Figs. 1, 2, 3, 6, and 10, by the numeral 20.

Referring particularly to Fig. 3 as an aid in describing the elements comprising sliding and reciprocating mechanism 20: Member 21 is cylindrically bored as indicated by dotted lines 22, to provide a sliding fit with rod 18, member 21 being also so formed as to rest upon the surface of base 15, and to be slidably positioned with respect to said rod and said base as desired. Stone 19 is clamped between members 23 and 24 (shown most clearly in said Fig. 3) by screws 25 extending through appropriate bores in member 23, and being screw-threaded into member 24, which said subsidiary assembly comprising stone 19 with its clamping elements 23 and 24 and screws 25, being slidably held against a flange 21a forming part of member 21, by means of the engagement of bevelled edge 26 of strip 27 secured within flange 21a by screws 28—28, a lower edge 29 of said member 23 being correspondingly bevelled to be slidingly held under the overhang formed by edge 26.

It will be seen that stone 19 with its clamping members 23 and 24 may be easily slid endwise from and out of its engagement with members 21 and 27 to permit turning, replacement or other operative manipulation of the abrasive member 19, and that when slidingly held between said members 21 and 27, it may, after proper positioning on rod 18 so as to contact with the surface to be abraded, be transversely reciprocated so as to perform its sharpening function.

To removably secure member 21 in any selected position longitudinally with relation to rod 18, a clamping member 30 provided with a cam surface 31 is pivoted at 32 so that its flanged end 33 may be raised or lowered to release or lock said cam surface 31 from or to the surface of said rod 18.

Figure 7:
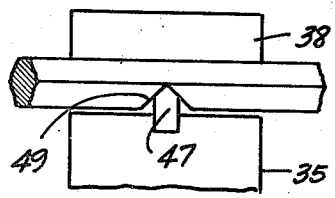
Fig. 7 is mainly a section on line 7—7 of Fig. 6, but showing in elevation a small portion with its ends broken off of the shank of an instrument clamped in position for sharpening, and illustrating the manner in which clamping means co-act with a groove formed in the shank of the instrument to position and hold said instrument for sharpening.
Figure 10:
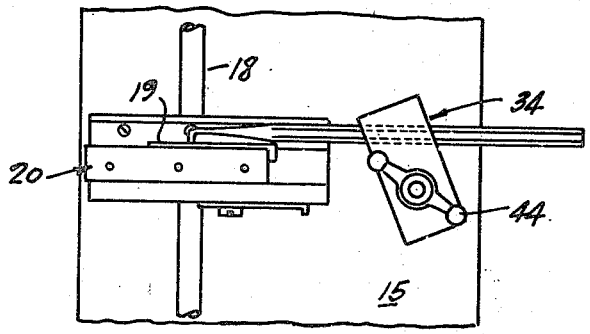
Fig. 10 is a fragmentary plan showing an instrument (such as the scaler illustrated in Fig. 11) held in position for sharpening, and illustrating the slidable abrasive holding means with its sharpening element in position and contact for reciprocatory movement necessary to recondition the cutting edge.

In Figs. 1, 6, and 10, tool or instrument-holding means are generally designated by the numeral 34. Details of such holding means can best be understood by reference to Figs. 4, 5, and 7, in conjunction with the grooves ground in the handles of the instruments illustrated in Figs. 8, 9, and 11. Referring particularly to Fig. 4, pedestal 35 is secured in the angular position, preferably at approximately a 60° angle, with respect to the stone 19 as shown in Fig. 1, in any suitable manner to base 15, as by screws 36 extending through a foot 37 integrally formed on the underside of base 15 and into a suitable screw-threaded bore in the base of said pedestal. An upper clamping member 38 having a flat underside, and conforming in shape to a cross-section of pedestal 35, is provided with a hole in which a downwardly extending cylinder 39, is secured by well known means as by welding. Cylinder 39 is adapted to fit slidably in a hole 40 in pedestal 35. The lower bore of hole 40 is reduced to provide a seat 41 for a spring 42 adapted to exert an upward urge against the lower end of cylinder 39. The vertical position of upper clamping member 38 relative to pedestal 35 is maintained by a bolt 43 threaded through base 15 and the reduced bore of hole 40 in the pedestal, which further reinforces the position of pedestal 35 relative to the base, and extends through the bore of spring 42 and cylinder 39, and above the upper clamping member 38. A winged nut 44 is screwed to the upper end of bolt 43, which, by manual rotation is adapted to urge, against the tension of spring 42, said clamping member against pedestal 35.

A guide to prevent rotation of the clamping member 38 relative to the pedestal 35 is indicated at 45 comprising a pin integrally secured with member 38 which extends into a hole 46 in the pedestal.

On the side of pedestal 35 opposite to hole 40, a key 47 is mounted, secured to the pedestal in any well known manner, having a cross-sectional contour conforming with a cross-section of the mutilation in the handles of the instruments as will appear. A pin 48 at the inner end of key 47 protruding from pedestal 38 provides an abutment which facilitates proper placement of the instrument on the key.

Figures 8, 9:
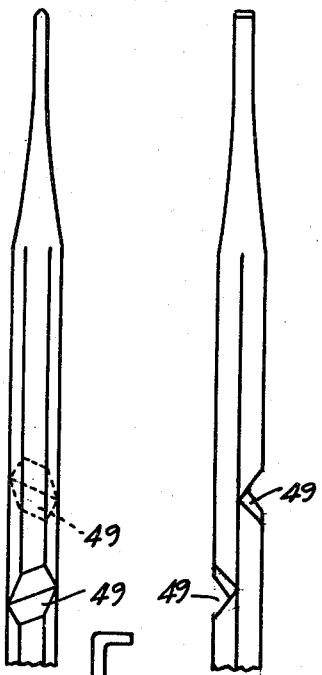
Fig. 8 is an elevation of all but the end of the handle (which is illustrated as broken off) of a dental instrument having cut in its handle, for holding within the clamping means, a groove.
Fig. 9 is an elevation of the subject-matter shown in Fig. 8, but on a plane perpendicular to that of Fig. 8.
Figure 11:
Fig. 11 is a fragmentary elevation of a dental instrument illustrating one of the many variations of form and position of cutting edges, and showing a groove in the handle of the instrument adapted for co-action with the clamping means to provide a proper angle of holding for sharpening.

Figs. 8 and 9 illustrate a dental hatchet and Fig. 11, a scaler, which are provided in the handle with a V-shaped groove 49, adapted to engage the key 47 of the clamping element. The angle of the groove 49 relative to the longitudinal axis of the instrument determines its position, when clamped, relative to the stone 19.

It will be understood that grooves 49 are positioned by the manufacturer of the instrument in each shank of each separate instrument at such a point and at such an angle that when the instrument is clamped between clamping members 35 and 38 with the key 47 of the pedestal fitting in the appropriate groove, the instrument will be so held with respect to the abrasive element 19 that the carriage of said abrasive element may be slid upon rod 18 so as to present the bezel of the cutting edge of the instrument in contact with the surface of the abrasive element at exactly the proper angle for reconditioning.

A slot 50 having straight parallel sides and a bottom perpendicular thereto is illustrated in Fig.

12 as another form of clamping surface in an instrument handle or shank. A modified form of clamp-member (Fig. 13) is provided therefor having a rectangular key 51 secured in pedestal 35. In Fig. 14 another modification of key is shown comprising a circular plate 52 formed to provide a flat lower clamping surface rigidly secured to the upper face of pedestal 35 having a chord of a Woodruff key 53 extending diametrically therethrough. A section of an instrument handle machined to fit the latter key is illustrated in Fig. 15 as in position in the clamp.

While it is obvious that the key of the clamping elements may be in any form to correspond with the shape of any indenture, channel, groove, slot, notch, depression, or combination thereof in the instrument shank of handle, it should also be noted that holes through the instrument may likewise be provided to accomplish the same purpose. In Figs. 16 and 17 a handle 54 so provided is disposed between modified clamping elements 55 and 56. A pin 57 mounted integral with the lower clamping element 55 extends through the hole in the instrument, thus holding the instrument in its correct angle for contact with the abrasive element. A hole 58 in the upper clamping member 56, is adapted to receive the pin 57 to align the clamping elements when pressure is exerted thereon by means heretofore described. The clamping elements are formed to engage the instrument only adjacent the hole to prevent uneven pressure or undue strain thereto. Upward side portions 59 (Fig. 17) of the lower clamping element prevent the instrument from rotating on pin 57.

It will be seen that I have provided a clamp adapted to co-act with clamping surfaces formed in the instrument which will maintain the bezel of all instruments in proper position relative to the abrasive element regardless of the angle of the cutting edge with respect to the longitudinal axis of the instrument. This will be clearly seen by referring to Fig. 18 et seq. Fig. 18 shows, in perspective, a scaler of the form shown in Fig. 11, in proper position on a stone 19. Fig. 19 is an end view along the lines 19—19 of Fig. 18.

Regardless of the machine employed, or even if accomplished manually, the instrument must not be incorrectly twisted, as shown in Fig. 20, nor must the instrument be improperly tilted from the correct position shown in Fig. 21 to the improper position shown in Fig. 22. In other words, to correctly position an instrument on a stone for sharpening, it must be both twisted and tilted until the bezel face is properly presented to the stone; and it must be maintained in this position for correct sharpening.

By means of my invention the precise twist and tilt of the instrument are predetermined in the manufacture, and the notches, slots, grooves, holes, etc. described above are positioned so that when the instrument is clamped, the correct twist and tilt are automatically obtained and maintained. This function of the device is positive in operation regardless of how irregular the shape or angle of the instrument may be.

Thus in Fig. 12, the parallel sides of the slot 50 determine the tilt of the instrument while the flat bottom 50a of the slot, determines the twist. Thus also in Figs. 14 and 15, the key 53 determines the tilt while the circular plate 52 determines the twist. Similarly in Figs. 16 and 17 the angularity of the hole with respect to the longitudinal axis of the instrument determines the tilt, while the positioning of the hole with respect to the lateral axis of the instrument determines the twist. In the form shown in Figs. 7 to 11, inclusive, the angularity of the groove with respect to the longitudinal axis of the instrument determines the tilt, while the angularity of the groove with respect to the lateral axis of the instrument determines the twist.

It will thus be seen that my invention may be universally applied for sharpening instruments of any description regardless of irregularity of shape or angular variation between instruments.

A modification involving changes in arrangement of parts and the substitution of a rotary abrasive element is shown in Figs. 24 and 25. The pedestal 35 of the clamping elements is mounted on slides 18a of a base 15a. Said base is substantially triangular in form, being approximately a right-triangle. A rotary abrasive element 62 is mounted in a standard 63 which is integral with the base 15a. A handle 65 is provided for manual rotation of the stone. Pedestal 35 may be moved to any desired position on slides 18a and then locked in such position in a manner commonly employed in locking the tailstock of a lathe. A depending bolt 66 provided with a washer 67 and a cotter-key 68 is normally urged upwardly by a spring 69 to lock pedestal 35 on slides 18a. When it is desired to shift the pedestal on the slides, spring 69 is depressed by means of trigger 70, unlocking the pedestal 35 from slides 18a and enabling the desired movement.

This form of the device has the advantage of simplification due chiefly to triangular form. It is unnecessary to provide a lateral slide such as mechanism 20, Fig. 1. It will be clear that both lateral and longitudinal movement of pedestal 35 with respect to abrasive element 62 are obtained as pedestal 35 is shifted along slides 18a. It is, furthermore, convenient to use both the obverse and reverse faces of the stone, in this device, enabling accommodation of instruments varying widely in angularity. Another important advantage is that by varying the distance of the notch (or other deformity) from the cutting edge of the instruments to be sharpened, it is possible to position the instrument bezels on the stone face at various selected points, thus distributing wear evenly on the stone face.

Having described my invention, I claim:

1. In a device for sharpening the cutting edges of a plurality of instruments, a clamp having oppositely-disposed clamping elements, a grinding element connected in fixed angular relation to said clamp, a plurality of members each secured integrally with one of the instruments to be sharpened and each having a clamping surface thereon at a different angle to their respective longitudinal axes, said clamping elements to co-act with said clamping surfaces of said members to hold each of said members at a different angle with respect to each other and to hold the bezels of the cutting edges with which said members are integrally secured parallel to said grinding element.

2. In a sharpener for the bezels of instruments, a clamp having a clamping surface, a grinding element, means to hold the face of said grinding element in a fixed angular relation to said clamping surface of said clamp, a plurality of members each integral with an instrument having a cutting edge to be sharpened, the longitudinal axis of each of said members forming an angle with the bezel of the cutting edge to which it is rigidly connected and each of said angles being different with respect to each other, a clamping surface on each of said members disposed at an angle to the bezel of the cutting edge of which it is an integral part equal to the fixed angle formed between the face of the grinding element and the clamping surface of said clamp.

3. In a device for sharpening instruments each having a flat plane surface to be sharpened, a clamp having oppositely-disposed clamping elements, a grinding element secured in fixed angular relation to said clamp, one of said clamping elements having a pair of surfaces forming an angle therebetween, a plurality of members each integral with an instrument to be sharpened and each having a pair of surfaces thereon forming an angle equal to the angle formed by said surfaces of said clamping element, said angularly disposed surfaces of said member being disposed at different acute angles to the longitudinal axis of said respective members, said members being adapted to be clamped between said clamping elements, to cause, by the engagement of said surfaces of said members by said surfaces of said clamping elements, the parallel alignment of the plane surface of respective instruments with the face of said grinding element.

4. In a device for sharpening instruments having the bezels of their cutting edges disposed at different angles to their respective longitudinal axes, a grinding element having a flat surface, a clamp connected to said grinding element comprising a pair of oppositely-disposed clamping jaws, a surface on one of said jaws disposed in a plane forming an angle with said grinding element, a member integrally secured to each of said instruments to be sharpened, a clamping face on each of said members disposed at an angle with respect to the bezels of the cutting edges of the instruments respectively, said angles between the clamping face of each member and the bezel of the instrument to which the respective members are secured being equal, whereby said clamp, by the coaction of said clamping face of said members and the clamping surfaces of said clamp, will support the bezels of the cutting edges of the instruments to which respective members are secured in parallel alignment with the surface of said grinding element, and means to hold said surface of said clamp at the same angle to the face of the grinding element throughout the sharpening of all of said instruments.

5. In a device for sharpening a plurality of separate cutting edges, a grinding element, a clamp having two jaws, one of said jaws having a clamping face, a plurality of members each integral with one of the cutting edges to be sharpened, the longitudinal axes of said members, respectively, being disposed at different angles to the bezels of the cutting edges integral therewith to be sharpened, a clamping face on each of said members disposed at an angle to the bezel of the cutting edge integral with the respective members, the angles formed between the clamping face of said members and the bezel of the cutting edge connected to the respective members being equal, said clamping jaws to clamp said members one at a time by the coactive engagement of said clamping face of said clamp with the clamping face of the respective members to hold the cutting edges, with the clamping of said members, parallel to the face of the grinding element, and means, operable simultaneously with the aforesaid operation of said clamp with respect to each of the members, to hold the clamping face of the clamp at the same angle to the face of the grinding element throughout the sharpening of said cutting edges.

6. In a device for sharpening the cutting edges of a plurality of instruments, each of said instruments having the bezels of their cutting edge at a different angle to the longitudinal axis thereof, respectively, the combination of a grinding element, a member integrally formed with each of said cutting edges to be sharpened, a clamping face on each of said members, each of said clamping faces being disposed at an angle to the bezel of the cutting edge to which the respective clamping faces are integrally secured, all of said last-mentioned angles being equal, and a clamp having a clamping surface to hold the bezels of said cutting edges parallel to said grinding element for sharpening by the coactive engagement of said clamping surface with said clamping face of said respective members, and means to hold said surface of said clamp at an angle to the grinding element equal to the angle formed between the clamping face on said member and the bezel of the cutting edge integral with said members, respectively, throughout the sharpening of said cutting edges.

7. In a device for sharpening the cutting edges of a plurality of instruments, each of said instruments having the bezel of their cutting edge at a different angle to the longitudinal axis thereof respectively, the combination of a grinding element, a member integrally formed with each of said cutting edges to be sharpened, a pair of diverging clamping faces on each of said members, the plane bisecting the angle formed by each pair of said diverging clamping faces being disposed at an angle to the bezel of the cutting edge to which the respective clamping faces are integrally secured, all of said last-mentioned angles being equal, a clamp having a pair of diverging clamping surfaces to move the bezels of said cutting edges parallel to said grinding element for sharpening by the coactive engagement of said diverging clamping surfaces with said diverging clamping faces of said respective members, and means to hold said surfaces of said clamp at an angle to the grinding element equal to the angle formed between the plane bisecting the angle formed by the clamping faces, respectively, on each of said members and the bezel of the cutting edges integral with said members respectively, throughout the sharpening of said cutting edges.

8. In a device for sharpening a plurality of instruments having the bezels of their cutting edges disposed at different angles to the longitudinal axes of their handles respectively, the combination of a grinding element, a clamp having a clamping face disposed at a fixed angle to the face of the grinding element, a clamping face on each of the handles of said instruments to be sharpened disposed at an angle to the bezel of the instrument to which said respective handles are attached, said last-mentioned angles being equal in each of said instruments to the fixed angle formed between the clamping face of said clamp and the face of the grinding element.

JOHN A. YERKES.